April 20, 1965
H. D. PEPPER
3,179,398
VARIABLE SHOCK ABSORBER
Filed Dec. 7, 1962
FIG. 1
FIG. 2
FIG. 3
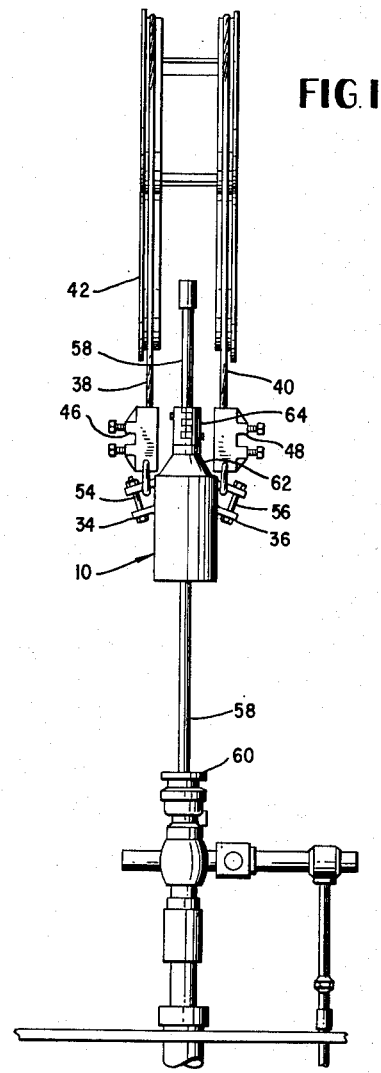
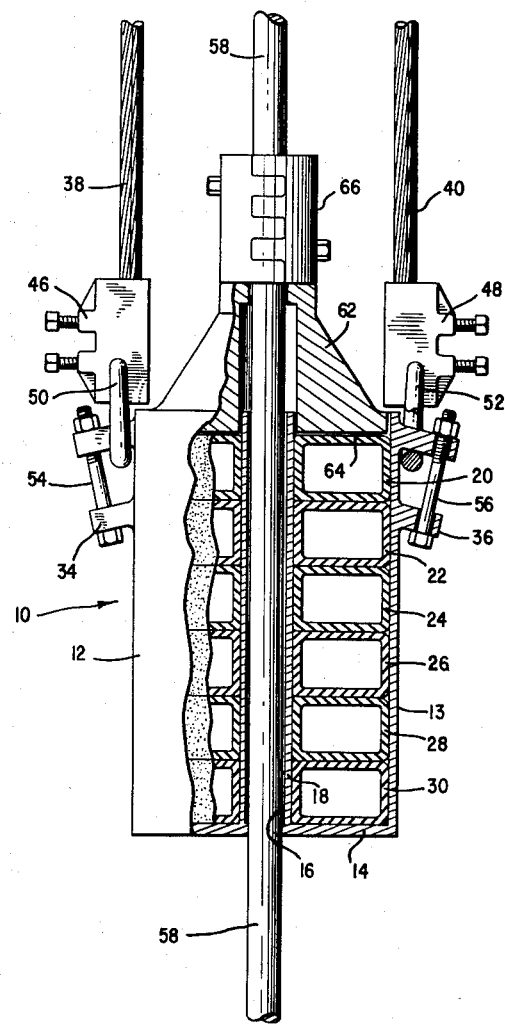
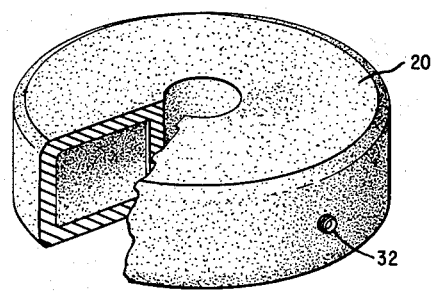
INVENTOR.
H. D. PEPPER

United States Patent Office 3,179,398
Patented Apr. 20, 1965

3,179,398
VARIABLE SHOCK ABSORBER
Hurley D. Pepper, Fullerton, Calif., assignor to Richfield Oil Corporation, Los Angeles, Calif., a corporation of Delaware
Filed Dec. 7, 1962, Ser. No. 243,040
4 Claims. (Cl. 267—1)

This invention relates generally to an improved shock absorber and, more particularly, to such an improved shock absorber which is capable of efficiently dampening impulsive forces of variable magnitude.

Load bearing equipment is frequently provided with a load or shock absorption device to reduce breakage of such equipment. The load bearing members of such equipment may be subject to forces of variable magnitudes as, for example, where surface equipment is employed to reciprocate sucker rods within a well bore with the sucker rods functioning to operate the well pump below the surface. The sucker rods are subjected to great strains due to the impulsive forces caused by the reciprocating movement of the rod in combination with the heavy weight of the rods themselves and the weight of the column of liquid being pumped. Consequently, many shock absorber devices have been designed for the purpose of coupling the prime mover equipment to load bearing members such as sucker rods in the oil well pumping art, in order to cushion the shock forces and thereby reduce the likelihood of breaking the load bearing member.

However, such prior art devices have only a single coefficient of compression, that is the stroke length and range of load absorption of such devices is limited. Consequently, there are portions of the load cycle which receive little or no benefit from these devices. Such a prior art device is shown in U.S. Patent No 2,237,303.

Therefore, the object of this invention is to provide a variable shock absorber system which is responsive to the full load range experienced by a load bearing member.

Another object is to provide a variable shock absorber with a plurality of pressurized elements each having a shock absorbing characteristic corresponding to a particular shock load range.

A more specific object of this invention is to provide a variable shock absorber having a plurality of pressure cells which may be easily charged with compressed air so that each cell may be made individually responsive to a selected load range.

Further objects and advantages of this invention will become apparent from the following description and accompanying drawing of the preferred embodiment of the invention:

In the drawing:

FIGURE 1 shows an oil well pump system into which this variable shock absorber may be incorporated;

FIGURE 2 is a partially cut away view of a preferred embodiment of the variable shock absorber of this invention; and FIGURE 3 shows a partially cut away view of one of the individual pressure cells of the preferred embodiment of this invention.

With reference to FIGURES 1 and 2, it can be seen that the variable shock absorber 10 comprises a cylindrical housing 12 having an outside wall 13 and a bottom wall 14. A centrally disposed bore 16 is formed in housing 12 by an inner wall 18.

Stacked within housing 12 is a plurality of annular or substantially toroidal shock absorbing cells 20, 22, 24, 26, 28 and 30, the structure of each of these cells being shown in more detail in FIGURE 3. The cells are made of a flexible material, such as rubber, and are shown to be hollow even through a honeycomb structure may be used. Each cell is provided with a conventional pressure sealing valve (not shown) through which an air inflating needle 32 may be inserted in order to pump the cell with air or any other compressible fluid, to the desired pressure.

With such an arrangement, each cell may be pumped to a pressure which gives the cell a shock absorbing characteristic particularly suitable for dampening a specified range of shock loads. By pressurizing each cell in accordance with a different load range expected to be encountered in the operation of a particular oil well pump, shock absorber 10 can be made to dampen or cushion efficiently the complete range of shock loads anticipated during the operation of said pump. For example, a shock load of relatively small magnitude would be absorbed or dampened by an individual cell which is pressurized to a relatively low pressure while a larger shock load would be absorbed by a cell under relatively high pressure.

Housing 10 is provided with a pair of trunnions 34 and 36 formed integrally with outer wall 13. A pair of cables 38 and 40 are suspended from an oil well pump horsehead 42. The cables are clamped at their lower ends by a pair of corresponding wire line clamps 46 and 48 which have depending yokes 50 and 52 which in turn hook over the trunnions 34 and 36 to suspend variable shock absorber 10 from horsehead 42. Retaining bolts 54 and 56 pass through the trunnions in order to maintain the yokes in position.

Passing through the bore 16 in housing 12 is a polish rod 58 which extends downwardly through a well head assembly 60 where it is connected to sucker rods (not shown) which extend into the well bore. Polish rod 58 may be considered as the upper section of the sucker rods.

Slidably mounted on polish rod 58 above housing 10 is a collar 62, whose lower surface 64 engages the upper surface of pressurized cell 20. Securely clamped about polish rod 58 above collar 62 is a suitable polish rod clamp 66 whose lower end abuts against the upper end of collar 62. In addition, safety chains (not shown) may be connected between retaining bolts 54 and 56 and corresponding cables 38 and 40 in order to minimize throw if a break should occur in the rod string.

In operation, for a particular well, a dynamometer is used to measure the loads experienced by polish rod 58 throughout a pumping cycle. Interpretations of these measurements indicate that many wells create repeated load cycles which are damaging to both the rod string and pump as well as to the surface pumping equipment. By proper dampening of the changing loads and by varying the polish rod and the connected sucker rod string motion from that transmitted by the pumping unit, the acceleration rate and peak velocity of the pump and rod string can be made to occur at a less severe point in the load cycle. These results are obtained by coupling the shock absorber 10 between the sucker rod string and the surface motion transmitting equipment, the shock absorber effectively moving in proportion to the existing load on the rods. To be fully effective, the shock absorber, acting as a load compensator must respond to the load range of each well and sensitive to the critical locations during a specific pumping cycle.

As horsehead 42 reciprocates vertically, cables 38 and 40 cause polish rod 58 and its attached sucker rods to be alternately raised and lowered. On an upward stroke, shock absorber 10 is pulled upwardly by the cables 38, 40 attached to housing 12 so that pressurized cell 20 engages collar 62 which in turn engages polish rod clamp 66 so that polish rod 58 in the attached sucker rods are pulled up. Obviously, on a downward stroke, the cables 38, 40 lower the shock absorber 10 and the weight of the polish rod 58 and sucker rods maintains clamp 66 in engagement with collar 62 so that the rods are lowered.

The rubber cells 20, 22, 24, 26, 28 and 30 are pressurized in accordance with the measurements made by the dynamometer test. In order that the impulsive forces or shocks experienced by the rod assembly during the pumping cycle may be efficiently dampened or cushioned, each rubber cell is pumped with air until the air pressure causes the rubber cell to exhibit a shock absorbing characteristic corresponding to one of the shock loads revealed by the dynamometer test. In other words, for a large magnitude shock load, one rubber cell is filled with air under relatively high pressure in order to cushion effectively the high shock load. Similarly, for a relatively low magnitude shock load, another rubber cell is filled with air under relatively low pressure in order to cushion effectively this smaller load.

If it is desired to shorten the compression stroke of the shock absorber, one or more of the rubber cells 28 through 30 may be filled with air under extremely high pressure or else one or more of the cells may be replaced by a solid rubber cell.

It can be seen from the foregoing description that the novel shock absorber 10 is adaptable to any well loading. Its shock absorbing characteristics may be changed in the field by pressurizing the individual rubber cells to the desired levels. It is also obvious that the device may be repaired or easily replaced. In summary, this novel variable shock absorber will compensate for the full range of loads experienced by the rod string so that peak torques, peak loads, minimum loads and rapid load changes will be lessened, consequently reducing pumping equipment failures.

The foregoing description has been directed to a preferred embodiment of the invention in the oil well pumping art wherein a sucker rod is reciprocated. The device of my present invention may, however, be used in conjunction with any type of oil well reciprocating pumping string, for example, it may be useful with systems wherein the well tubing or other well strings are reciprocated. It should also be understood that the variable shock absorber system of my present invention has general utility as a shock absorber, and that other variations and modifications thereof will be apparent to those skilled in the art and, therefore, it is intended that the invention be limited in scope only as defined in the appended claims.

I claim:

1. A variable shock absorber assembly for use on the polish rod of an oil well pump sucker rod assembly comprising a cylindrical housing having a longitudinal bore for receiving a polish rod, a plurality of substantially annular, hollow shock absorbing elements stacked within said housing, the central aperture in each of said elements being aligned with the bore of said housing, means for filling said elements with a compressible fluid under pressure whereby the shock absorbing characteristic of each element is determined by the fluid pressure contained therein, at least two of said elements having different shock absorbing characteristics, and means for coupling said variable shock absorber assembly to the polish rod so that longitudinal impulsive forces of various ranges of magnitudes applied to the polish rod are each dampened by a shock absorbing element having a shock absorbing characteristic corresponding to each range of magnitudes.

2. A variable shock absorber assembly for use on a polish rod of an oil well pump sucker rod assembly comprising a cylindrical housing having a longitudinal bore for receiving a polish rod, a plurality of hollow, substantially annular shock absorbing elements stacked within said housing, each of said elements containing a compressible fluid under pressure, the central aperture in each of said elements being aligned with the bore of said housing, at least two of said elements having different shock absorbing characteristics, and means for coupling said variable shock absorber assembly to the polish rod so that longitudinal impulsive forces of various ranges of magnitudes applied to the polish rod are each dampened by a shock absorbing element having a different shock absorbing characteristic corresponding to each range of magnitudes.

3. A variable shock absorber assembly for use on the polish rod of an oil well pump sucker rod assembly comprising a cylindrical housing having a longitudinal bore for receiving the polish rod, a plurality of substantially annular, hollow shock absorbing elements stacked within said housing, the central aperture in each of said elements being aligned with the bore of said housing, each of said elements containing a compressible fluid under pressure, at least two of said elements having different pressures, the shock absorbing characteristic of each element being determined by the pressure of the fluid contained therein, and means for coupling said variable shock absorber assembly to the polish rod so that the longitudinal impulsive forces of various ranges of magnitudes applied to the polish rod are each dampened by a shock absorbing element having a shock absorbing characteristic corresponding to each range of magnitudes.

4. A variable shock absorber assembly for use with an oil well reciprocating pumping string comprising: a cylindrical housing having a longitudinal bore for receiving said pumping string, a plurality of substantially annular shock absorbing elements stacked within said housing, the central aperture in each of said elements being aligned with the bore of said housing, means for filling said elements with a compressible fluid under pressure whereby shock absorbing characteristics of each element are determined by the fluid pressure contained therein, at least two of said elements having different shock absorbing characteristics, and means for coupling said variable shock assembly to said pumping string so that longitudinal impulsive forces of various ranges and magnitudes applied to said pumping string are each dampened by a shock absorbing element having a shock absorbing characteristic corresponding to each range of magnitude.

References Cited by the Examiner

UNITED STATES PATENTS

| 67,897 | 8/67 | Miller | 267—35 |
|---|---|---|---|
| 1,243,526 | 10/17 | Hughes et al. | 267—29 |
| 1,937,511 | 12/33 | Crane | 267—35 X |
| 2,038,527 | 4/36 | Eaton | 267—70 X |
| 2,144,357 | 1/39 | Booharin. | |
| 2,241,409 | 5/41 | Mason | 267—1 X |

FOREIGN PATENTS

| 21,264 | 1896 | Great Britain. |
|---|---|---|
| 792,738 | 10/35 | France. |

ARTHUR L. LA POINT, *Primary Examiner.*